No. 710,088. Patented Sept. 30, 1902.
W. F. WELLMAN.
ROLLER BUSHING FOR SHEAVES.
(Application filed Feb. 3, 1902.)
(No Model.)

WITNESSES:
A. D. Harrison
P. W. Pezzetti

INVENTOR-
W. F. Wellman
by Dight & Brown Quimby
Attys.

UNITED STATES PATENT OFFICE.

WILLARD F. WELLMAN, OF BELMONT, MAINE.

ROLLER-BUSHING FOR SHEAVES.

SPECIFICATION forming part of Letters Patent No. 710,088, dated September 30, 1902.

Application filed February 3, 1902. Serial No. 92,294. (No model.)

*To all whom it may concern:*

Be it known that I, WILLARD F. WELLMAN, of Belmont, in the county of Waldo and State of Maine, have invented certain new and useful Improvements in Roller-Bushings for Sheaves, &c., of which the following is a specification.

This invention relates to a bushing for sheaves and pulleys, said bushing comprising a cylindrical chamber formed for attachment to the center of a pulley and adapted to present a cylindrical bearing to the peripheries of a series of rolls and to confine said rolls against displacement in any direction, the rolls being arranged in a circular series surrounding the pintle or journal on which the pulley rotates.

The invention consists of the improvements which I will now proceed to describe and claim.

Figure 1:
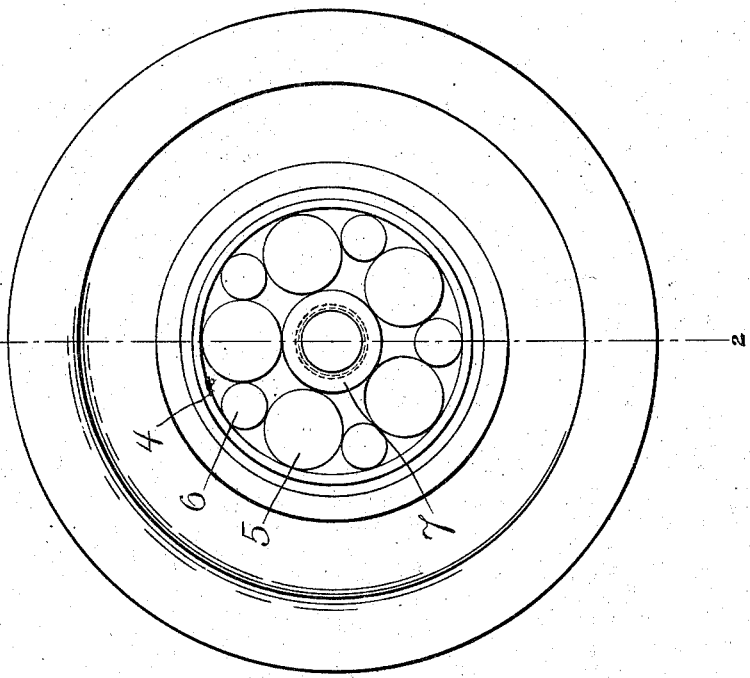
Figure 2:
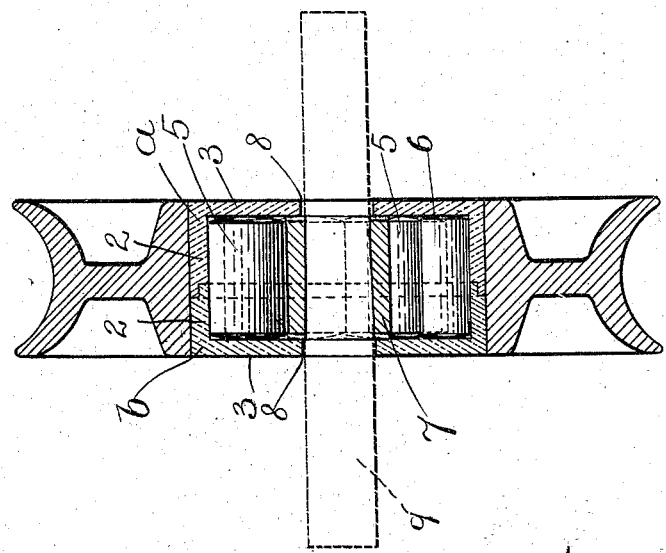

Of the accompanying drawings, forming a part of this specification, Figure 1 represents a side elevation of a sheave or pulley having a bushing embodying my invention, a part of the bushing being removed to show the internal rolls and sleeve. Fig. 2 represents a section on line 2 2 of Fig. 1.

The same characters of reference indicate the same parts in all the figures.

In the drawings, $c$ represents the body of the sheave, which is cast or otherwise formed with a central aperture or socket to receive the bushing, the latter being composed of two members $a$ $b$, which are formed to have a drive fit in the wall of the socket in the pulley $c$, so that they can be forced into the socket by a strong pressure and when inserted are held by friction in the pulley. Each member comprises a cylindrical marginal portion 2 and a flange 3, formed on one end of said marginal portion. The meeting ends of the marginal portions of the two members are formed to be detachably coupled or connected together within the pulley, as shown in Fig. 2, the two members collectively forming a bushing having a chamber with a cylindrical marginal bearing-surface 4, which constitutes the outer bearing or raceway for a series of bearing-rolls 5 and a series of separating-rolls 6. The flanges 3 prevent endwise displacement of the rolls 5 and 6.

7 represents a sleeve which is formed to bear upon the inner sides of the bearing-rolls 5 and prevent inward movement of said rolls toward the axis of the bushing. Said sleeve is of greater diameter than the openings 8, surrounded by the end flanges 3, so that the sleeve is confined within the bushing against endwise displacement by said end flanges. The sleeve is loosely inserted in the bushing and is formed to be contained in the space between the flanges 3. The interior of the sleeve is formed to receive and closely fit the pintle or bearing 9, on which the bushing and sheave rotate. In practice the pintle is driven with a tight friction fit into the sleeve, so that when the sheave is in use the sleeve becomes practically a part or enlargement of the pintle and does not rotate with the bushing and rollers. To insure a sufficiently tight frictional fit between the sleeve and the pintle, I prefer to slightly taper the interior of the sleeve and correspondingly taper the portion of the pintle which enters the sleeve. The pintle can therefore be driven into the sleeve until the two are firmly interlocked by friction and can at any time be driven out whenever it is necessary to renew the sleeve 7 or the rollers or to obtain access to the interior of the bushing for any purpose.

It will be seen that the sleeve protects the pintle from wear and that the pintle can be removed and a new sleeve put on as often as the same may be required. The sleeve is preferably made somewhat shorter than the space between the flanges 3 of the bushing, so that the sheave may have a slight oscillating movement on the pintle against the block-straps on the side without bringing the shell in contact with the end of the sleeve. It will be observed that the sleeve prevents the rolls from dropping toward the center or axis of the bushing whether the pintle is in place or not. The employment of the sleeve enables the holes in the end of the shell to be made much smaller than they can be in many other bushings, so that there is less liability of the entrance of foreign matter into the interior of the bushing than usual.

This improved bushing may be used in sheaves for ships' blocks and for any other uses to which an antifriction-bushing has application.

I claim—

1. A roller-bushing comprising two separable bushing members adapted to enter a socket in a sheave or pulley, each member having a cylindrical recess at its inner side the margin of which forms a raceway and an annular flange at its outer end forming an end wall of the recess, a series of bearing-rolls in contact with the cylindrical margin of the chamber, a series of separating-rolls in contact with the said cylindrical margin and with the bearing-rolls, the said rolls being confined against endwise displacement by said end walls, and a sleeve in contact with the inner surfaces of the bearing-rolls and preventing inward movement thereof, toward the axis of the bushing, said sleeve being confined against endwise displacement by said end walls and formed internally to receive the journal or pintle on which the sheave rotates.

2. A roller-bushing comprising two separable bushing members adapted to enter a socket in a sheave or pulley, each member having a cylindrical recess at its inner side the margin of which forms a raceway and an annular flange at its outer end forming an end wall of the recess, a series of bearing-rolls in contact with the cylindrical margin of the chamber, a series of separating-rolls in contact with the said cylindrical margin and with the bearing-rolls, the said rolls being confined against endwise displacement by said end walls, and a sleeve in contact with the inner surfaces of the bearing-rolls and preventing inward movement thereof, toward the axis of the bushing, said sleeve being confined against endwise displacement by said end walls and internally tapered to receive and engage a tapered journal or pintle.

In testimony whereof I have affixed my signature in presence of two witnesses.

WILLARD F. WELLMAN.

Witnesses:
B. H. CONANT,
L. M. SLEEPER.